US011739193B2

(12) United States Patent
Esperandio de Oliveira

(10) Patent No.: US 11,739,193 B2
(45) Date of Patent: Aug. 29, 2023

(54) POLYMER COMPOSITE, USE OF SAID COMPOSITE IN PREPARING ARTICLES, PROCESS OF PREPARING SAID COMPOSITE AND ARTICLES COMPRISING SAID COMPOSITE

(71) Applicant: Sileto Pesquisa e Desenvolvimento S.A., Rio de Janeiro (BR)

(72) Inventor: Geiza Esperandio de Oliveira, Rio de Janeiro (BR)

(73) Assignee: SILETO PESQUISA E DESENVOLVIMENTO S.A., Rio de Janeiro (BR)

( * ) Notice: Subject to any disclaimer, the term of this patent is extended or adjusted under 35 U.S.C. 154(b) by 202 days.

(21) Appl. No.: 17/225,766

(22) Filed: Apr. 8, 2021

(65) Prior Publication Data
US 2021/0317284 A1  Oct. 14, 2021

(30) Foreign Application Priority Data

Apr. 13, 2020  (BR) .......................... 102020007268-4

(51) Int. Cl.
| C08K 3/34 | (2006.01) |
| C08K 3/36 | (2006.01) |
| C08K 7/06 | (2006.01) |
| C08K 7/14 | (2006.01) |
| C08L 21/00 | (2006.01) |
| C08L 47/00 | (2006.01) |
| C08L 67/02 | (2006.01) |

(52) U.S. Cl.
CPC ................ *C08K 3/346* (2013.01); *C08K 3/36* (2013.01); *C08K 7/06* (2013.01); *C08K 7/14* (2013.01); *C08L 21/00* (2013.01); *C08L 47/00* (2013.01); *C08L 67/02* (2013.01); *C08L 2207/24* (2013.01)

(58) Field of Classification Search
CPC . C08K 3/346; C08K 3/36; C08K 7/06; C08K 7/14; C08L 21/00; C08L 47/00; C08L 67/02; C08L 2207/24
USPC .......................................................... 524/65
See application file for complete search history.

(56) References Cited

U.S. PATENT DOCUMENTS

| 4,684,695 | A | * | 8/1987 | Oshima ................. C08G 63/918 528/304 |
| 5,609,295 | A | | 3/1997 | Richards |
| 5,886,078 | A | * | 3/1999 | Sullivan ................... B29B 7/007 521/79 |
| 8,728,376 | B2 | | 5/2014 | Djerf et al. |
| 2002/0123553 | A1 | * | 9/2002 | Sullivan ................. C08L 101/00 524/449 |
| 2003/0085293 | A1 | | 5/2003 | Nosker et al. |
| 2004/0175452 | A1 | | 9/2004 | Sullivan et al. |
| 2005/0065267 | A1 | | 3/2005 | Sullivan et al. |
| 2008/0098935 | A1 | | 5/2008 | Roth et al. |
| 2016/0251807 | A1 | * | 9/2016 | Hawkins ................... F16B 7/00 238/85 |
| 2018/0066402 | A1 | | 3/2018 | Sakai et al. |

FOREIGN PATENT DOCUMENTS

| BR | 9711376 | 8/1999 |
| BR | PI0501724 | 1/2007 |
| BR | PI0502483 | 1/2007 |
| BR | PI 0516420-6 A | 9/2008 |
| BR | PI1003132 | 6/2012 |
| BR | PI 0207976-3 B1 | 10/2014 |
| BR | 11-2017-020280 A2 | 6/2018 |
| CN | 10120184 | 7/2008 |
| CN | 103221457 | 7/2013 |
| CN | 106554592 A * | 4/2017 |
| CN | 106554592 A | 4/2017 |
| EA | 011818 | 6/2009 |
| EP | 0344693 A2 | 12/1989 |
| EP | 0710743 A1 | 5/1996 |
| EP | 3263767 | 1/2018 |
| RU | 2544549 C1 * | 3/2015 ............ C07F 283/14 |
| RU | 2544549 C1 | 3/2015 |

(Continued)

OTHER PUBLICATIONS

International Search Report and Written Opinion for International Application No. PCT/BR2021/050095, dated Apr. 12, 2021, (20 pages), National Institute of Industrial Property (Instituto Nacional Da Propriedade Industrial), Rio de Janeiro, Brazil.
International Preliminary Report on Patentability for International Application No. PCT/BR2021/050095, dated Jul. 29, 2022, (4 pages), Austrian Patent Office, Vienna, Austria.
Ushakov, A.E. et al. "Design and Optimization of a Vacuum Infusion Technological Process for Hopper Car Fabrication Using Polymeric Composite Materials," *Journal of Machinery Manufacture and Reliability*, vol. 44, No. 3, pp. 276-282, May 2015. ISSN: 1052-6188. DOI: 10.3103/S105261881503022X.
Mozafari, Hozhabr et al. "Out of Plane Crushing and Local Stiffness Determination of Proposed Foam Filled Sandwich Panel for Korean Tilting Train eXpress—Numerical Study," *Materials & Design*, vol. 66, Part B, pp. 400-411, Feb. 2015. ISSN: 0261-3069. Available online: <URL: https://doi.org/10.1016/j.matdes.2014.07.037>.

(Continued)

*Primary Examiner* — Ling Siu Choi
*Assistant Examiner* — Ronald Grinsted
(74) *Attorney, Agent, or Firm* — Alston & Bird LLP

(57) ABSTRACT

The present invention refers to a polymer composite that comprises sand preferably medium, at least a load, at least a resin selected from among dicyclopentadiene polyester resin (DCPD) and resin PET and at least a phase-compatibilizing additive and/or flexibilizing agent of the polymer structure. Further, the present invention refers to process of preparing said composite besides the use of said composite for preparing some articles including sleepers. This composite presents several advantages when compared to the materials used today for preparing sleepers as it is more versatile than steel, more available and as effective as wood, more durable than the concrete as it comprises an optimized composition that combines ideal physical-chemical properties to exercise the function for which it was intended.

16 Claims, No Drawings

(56) References Cited

FOREIGN PATENT DOCUMENTS

| WO | WO-2005/013669 | A2 |   | 2/2005 |          |           |
|----|----------------|----|---|--------|----------|-----------|
| WO | WO-2005013669  | A2 | * | 2/2005 | ........... | B29C 43/003 |
| WO | WO-2019/089292 | A1 |   | 5/2019 |          |           |
| WO | WO-2019089292  | A1 | * | 5/2019 | ............. | E01B 13/00 |

OTHER PUBLICATIONS

Kaysser, Wolfgang et al. "Research With Neutron and Synchrotron Radiation on Aerospace and Automotive Materials and Components," *Advanced Engineering Materials*, vol. 13, pp. 637-657, Jul. 15, 2011. ISSN: 2214-3912. Available online: <URL: https://doi.org/10.1002/adem.201100150>.

Kruglikov, A.A. et al. "Strengthening of the Railway Ballast Section Shoulder With Two-Component Polymeric Binders," *Transportation Geotechnics*, vol. 11, pp. 133-143, Jun. 2017. Available online: <URL: https://doi.org/10.1016/j.trgeo.2017.05.004>.

* cited by examiner

POLYMER COMPOSITE, USE OF SAID COMPOSITE IN PREPARING ARTICLES, PROCESS OF PREPARING SAID COMPOSITE AND ARTICLES COMPRISING SAID COMPOSITE

CROSS REFERENCE TO RELATED APPLICATIONS

This application claims priority to Brazil Patent Application No. BR 102020007268-4, titled "POLYMER COMPOSITE, USE OF SAID COMPOSITE IN PREPARING ARTICLES, PROCESS OF PREPARING SAID COMPOSITE AND ARTICLES COMPRISING SAID COMPOSITE," filed Apr. 13, 2020, which is incorporated by reference herein in its entirety.

FIELD OF THE INVENTION

The present invention pertains to the Construction Industry, Transport, Logistics and Infrastructure sectors and refers to a polymer composite that comprises at least a load, at least an additive and at least a resin selected from among dicyclopentadiene (DCPD) polyester resin and PET thermosetting resin.

Further, the present invention refers to the process of preparing said composite besides the use of said composite for preparing some articles including, but not limited to, sleepers, crossheads, beams, interlocking floors, pre-molded civil engineering panels, artificial stone for countertops and flooring, paving slabs used in bridges, paneling and cobogos (breeze block walls).

BACKGROUND OF THE INVENTION

After long years without incentives or investments, railway assets suffered from depreciation and lack of maintenance. The current scenario, including anticipated renovations and the increased demand for cargo flow, mainly for ports, requires creativity in planning the recovery and modernization actions of the lines.

Sleeper is the element of the railway superstructure whose function is to receive and transmit to the ballast the strain produced by the actions of the vehicles, acting as support for the tracks, enabling them to be fixed and keeping the distance between them invariable. To fulfill this purpose, the following is necessary:

Its dimensions, in length and in width, provide a sufficient support surface so that the working rate on the ballast does not exceed a certain limit;

Its thickness gives it the necessary rigidity, enabling some elasticity;

Its sufficient resistance to strain;

Its durability;

It enables, with relative ease, the leveling of the ballast, in its phase;

It effectively opposes the longitudinal and transversal displacement of the track;

It enables the track to be fixed solidly, that is, firmly fixed, without being excessively rigid.

With the increased consumption of sleepers and consequent scarcity of wood, treatment measures have emerged with preservation products in order to increase the useful life of the wood sleeper, thus preventing the housing of microorganisms such as fungi and insect proliferation. Such products are highly contaminated from the soil. Another solution found for the growing scarcity of wood has been the planting of eucalyptus forests, because it is a fast growing tree and because its wood has high density, requiring little or no preservative treatment. However, the useful life of the eucalyptus as sleeper is extremely low, needing to be frequently replaced. In this context of scarcity of natural resources, and with a view to replacing wood for both economic and environmental reasons, sleepers made of other materials have been sought after and adopted, such as concrete, steel and polymers.

In addition to the higher price, the reinforced concrete sleeper does not have the unanimous preference of the rail sector, due to its excessive rigidity, lower energy absorption and impact resistance compared to other sleepers. Metal sleepers are lighter and easy to handle, but this lightness makes the track less stable, and are noisier in operation. One of the solutions for this demand is the sleeper made of plastic or polymer.

With regard to reinforced concrete, although it is a great material, due to its versatility and cost, it has disadvantages such as the development of internal stresses that combined with its low mechanical resistance, makes it prone to cracking that allows the entry of aggressive agents, sustaining major corrosion. For these and other reasons, the conventional reinforced concrete has been gaining attention from researchers with regard to improving its characteristics.

Polymer-modified concrete was initially used as a repair for Portland cement concrete. However, in recent years there has been a growing expansion of its applications in industrially developed countries.

Concrete-polymer composites are defined as a mixture of agglomerates, using as the only binder a polymer, copolymer, terpolymer or polymer mixtures, without the use of ceramic binder, such as cement.

In Brazil, polymer composites used for preparing sleepers are still hardly used due to their higher cost and scant knowledge of the properties. Currently, solutions are known involving use of polyethylene and polypropylene as polymeric matrix, both thermoplastic, more sensitive to temperature variations, besides being flammable.

Literature has few studies on the use of polyester resins of the orthophthalic and isophthalic type, as concrete-polymer, but in the manufacture of sleepers, studies already carried out to-date do not present evidence of promising results.

We highlight below some teachings of the state of the art that refer to this matter:

Document BR 11 2017 020280-8 describes a composition for track cushions for railroads, characterized by comprising a random copolymer of ethylene/α-olefin/polyene specific unconjugated polyene (a), clay (b) and a coupling agent of silane containing sulfur atom (c). The molded object obtained starting from the composition through crosslinking, especially through the crosslinking of foamy mold, possesses rubber elasticity suitable for track cushions for railroads.

Document CN 101220184 describes a rubber support plate that comprises an unconjugated diene. It is said that this invention pertains to the field of processing accessories in the railway, subway or light rail industries, and particularly relates to a rubber plate and a process of manufacturing it. This plate is indicated to be placed between the track and the sleeper.

Document CN 103221457 describes a modified polymer that comprises sulfur and dicyclopentadiene in addition to other compounds. This polymer is indicated to be used in a concrete composition.

Document EA 011818 describes, among other categories, a sleeper that comprises a structural composite material formed from a central material of stable geometric dimensions wrapped in a coating with a stable geometric dimension that is adhered to the central material, the coating being a laminated structure formed from at least a strand of substantially parallel reinforcing cables adhered to at least one layer of networked material selected from the group composed of rigid paper hardened and woven with the paper or fabric impregnated with a hardened resin in which the resin hardening is mixed with the solid dispersion filler.

Document BR 0516420 discloses an appropriate composite structural material, for example, as a substitute for wood planks, or poles. It comprises a dimensionally stable core material surrounded by a dimensionally stable lamellar cover that is adherent to the core material. The lamellar cover is comprised of at least one strip of substantially parallel reinforcing wires agglutinated to at least one layer of a dimensionally stable network material selected from the group consisting of stiffened paper and stiffened cloth. Preferably the strip of reinforcing cables is placed between two layers of stiffened paper or cloth. The core material can be, for example, a foaming synthetic resin with or without filler.

Document BR 9711376 discloses a compound produced from recycled materials, including PET soda bottles and poorly adjusted plastics or gutter residues. These materials generally include a significant amount of high-density polyethylene ("HDPE") mixed with a variety of other plastics, such as polyvinyl chloride ("PVC"), polyethylene terephthalate ("PET") (from soda bottles or other, polypropylene ("PP"), polyethylene ("PE") and other smaller components. The composite building material is composed of an extruded mixture of high density polyethylene and a thermoplastic coated fiber material such as fiberglass.

Document EP 3263767 refers to mold bodies that are made of thermoplastic material or that contain basic body in their longitudinal motion. Polymers are provided for, in particular polyolefins, as thermoplastic material, in particular one or more materials of the polyethylene group, in particular LDPE and/or HDPE polyethylene, polypropylene, polyvinyl chloride, polyethylene ether, polycarbonate, polyamide, acrylonitrile-butadiene-styrene, polymethylmicroacrylate, polystyrene.

Document PI 1003132-4 refers to an ecological mass composed of plastic materials, tar, stone and sand, and the process of obtaining it, the mass of which is applied in construction and or in the manufacture of sleepers. The plastic materials in question are derived from packaging recycling processes, mainly focused on recycling PET bottles, and are mixed with tar, being a thermoplastic material, with a work temperature of between 200° C. and 300° C.

Document PI 0501724-6 refers to the use of unusable tires, through the arrangement in blades of glued tire strips, overlaid by a corrosion resistant steel plate, ribbed, where a support plate is fitted with elastic clip to lock the rail, this whole set fastened by metal rivets creating a unit and maintaining the gauge as foreseen.

Document PI 0502483-8 refers to sleepers of prestressed tires and in manufacturing pieces of tires will be used, joined together by one or more steel strips. The pieces of tires joined by compression of the steel strip(s) shape the sleeper body, which resists the strain resulting from the passage of the train, and by being flexible it allows vibration-free and noiseless train traffic.

Therefore, the state of the art offers no solution equivalent to the one presented here in the present invention that combines technical differentials, economic advantages, safety and reliability.

OBJECTIVES OF THE INVENTION

Thus, it is an objective of the present invention to develop composite materials for use in infrastructure, mainly in the manufacture of polymeric sleepers, as well as other artifacts that are currently made from a cement matrix, such as interlocking floors, pre-molded civil engineering panels, artificial stone for countertops and flooring, paving slabs used in bridges, paneling and cobogos.

It is an objective of the present invention to provide sleepers based on thermosetting polyester resins and additives for the purpose of replacing concrete sleepers for thermorigid polymer-based sleepers.

It is another objective of the present invention to provide polymeric sleepers of high mechanical resistance, resistance to chemicals and weathering that advantageously replace existing sleepers.

It is another objective of the present invention to provide rail sleepers with mechanical and physical-chemical properties that meet the requirements of national and international standards specific to sleepers, as well as all the dimensions required by the railways (wide gauge, metric gauge, mixed gauge).

It is another objective of the present invention to provide a polymer composite to be used primarily in the preparation of sleepers so as to offer technical and economic advantages when compared to sleepers made of wood, steel and concrete.

Further, it is another objective of the present invention to provide sleepers that, in relation to concrete-based sleepers, are lighter, waterproof and do not necessarily require an iron frame structure.

Also, it is another objective of the present invention to provide smaller-thickness interlocking floors (<60 mm) with compression strength similar to the current high-performance thick (100 mm) interlocking floors, which undergo considerable compression and abrasion.

Another objective of the present invention is to provide products that are currently cement-based that undergo substantial compression strain or heavy abrasion or even require specific finishing (like coloring or polishing), such as pre-molded civil engineering panels, artificial stones for countertops and flooring, paving slabs used in bridges, paneling and cobogos.

SUMMARY OF THE INVENTION

The present invention achieves these and other objectives by means of a polymer composite that comprises:

Sand, preferably medium;

At least a load being selected from the group consisting of fly ash, silt, calcium carbonate powder, stone dust, foundry sand, fine sand, silica and combinations thereof;

At least a resin being selected from among dicyclopentadiene, PET monomer and combinations thereof;

At least an additive being selected from among phase-compatibilizing additives, also called coupling agents, such as vinyltrimethoxysilane, methacryltrimethoxysilane, methacryloxypropyltrimethoxysilane, calcium diacrylate, zinc diacrylate and combinations thereof, or flexibilizing agents of the polymer structure being selected from among butylacrylate, butylmethylacrylate, methylmethacrylate, triethyleneglycolmethacrylate, ethylhexylmethacrylate and combinations thereof.

Further, the present invention achieves these and other objectives by means of optionally adding, as required, the following phases in the composite:

Ground rubber, originating from tires;
Fiberglass or metal fiber, and may be short and distributed evenly in the matrix, or long and aligned in a single direction;
Screens and metal or polymer frames in layers or structures.
Flexibilizing additives of the polymer structure being selected from among the butylacrylate, butylmethylacrylate, methylmethacrylate, triethyleneglycolmethacrylate, ethylhexylmethacrylate used in isolation and/or combinations thereof.

Further, the present invention achieves these and other objectives by means of a process of preparing the polymer composite above by molding.

Further, the present invention achieves these and other objectives by using a polymer composite as defined above for preparing an article being selected from among sleepers, crossheads, beams, interlocking floors, pre-molded civil engineering panels, artificial stone for countertops and flooring, paving slabs used in bridges, paneling and cobogos.

DETAILED DESCRIPTION OF THE INVENTION

The present invention refers to a polymer composite that comprises fine aggregates, at least a resin being selected from among dicyclopentadiene (DCPD), PET monomers for thermosetting resin and the use of at least an additive being preferably a phase-compatibilizing additive, also called coupling agents, such as the vinyltrimethoxysilane, methacryltrimethoxysilane, methacryloxypropyltrimethoxysilane, calcium diacrylate, zinc diacrylates, or flexibilizing agents of the polymer structure being selected from among the butylacrylate, butylmethylacrylate, methylmethacrylate, triethyleneglycolmethacrylate, ethylhexylmethacrylate and/or combinations thereof.

In a preferred embodiment of the present invention the composite comprises resin, sand preferably medium and at least a load being selected from the group consisting of fly ash, silt, calcium carbonate powder, stone dust, foundry sand, fine sand, silica and combinations thereof whose mixture is perfect for meeting the load and distribution requirements for the ballast. It is emphasized that when used for preparing sleepers, this composite:

Has no water in its composition;
Has no high density reinforced skeleton;
Is waterproof;
Is lighter than the concrete with ironwork;
Is completely compatible with the sleepers made of concrete and partially compatible with the sleepers made of wood, admitting any format and size sleepers;
Is a highly homogeneous material in its composition generating greater reliability in the prevention of accidents;
Has high strain resistance being of high mechanical resistance, both compressive and tractive in bending and diametric compression, as well as in fatigue processes;
Features long durability which makes it the best cost/benefit ratio over time.

It is also noteworthy that the polymer composite of the present invention is a polymer concrete obtained from the substitution for polymer of part or all the binder of conventional concrete.

The composite object of the present invention comprises resin, sand preferably medium and at least a load, and can also comprise optional components, such as:

Fiberglass or metal fiber, which can be short and evenly distributed in the matrix, or long and aligned in a single direction;
Ground rubber, originating from tires;
Screens and metal or polymer frames in layers or structures;
At least an additive being selected from among phase-compatibilizing additives, also called coupling agents, such as the vinyltrimethoxysilane, methacryltrimethoxysilane, methacryloxypropyltrimethoxysilane, calcium diacrylate, zinc diacrylate and combinations thereof, or flexibilizing additives of the polymer structure being selected from among the butylacrylate, butylmethylacrylate, methylmethacrylate, triethyleneglycolmethacrylate, ethylhexylmethacrylate and combinations thereof.

Resin

The resin present in said composite is selected from among dicyclopentadiene (DCPD), PET monomers and combinations thereof.

DCPD

Dicyclopentadiene (DCPD) is a chemical compound having the formula $C_{10}H_{12}$. At ambient temperature, it is a light yellow color liquid with an arid odor.

Its major use is in resins, particularly, resins made of unsaturated polyester. It is also used in paints and adhesives.

In the present invention, DCPD is added in an amount ranging from 3% to 40%, in mass, preferably 5% to 35%, in mass and more preferably 7 to 30%, in mass, based on the total mass of the composition of the composite.

PET

Polyethylene terephthalate, or PET, is a thermoplastic polymer, developed in 1941, formed by the reaction between terephthalic acid and ethylene glycol. It is mainly used in the form of fibers for weaving and packaging for beverages. It is a polyester by having the functional ester group in its main chain, and has thermoplastic properties, this is, it can be reprocessed several times by the same or by another transformation process.

Polyethylene terephthalate is produced industrially in two steps: pre-polymerization and polycondensation, wherein the first step corresponds to the manufacture of terephthalate oligomer of bis (2-hydroxyethylene), BHET, from two routes, and polycondensation is responsible for PET production. The first route is direct esterification, where a reaction will occur between the terephthalic acid and the ethyleneglycol, characterized by being heterogeneous, autocatalytic, that is, the use of catalysts is not required, with a working temperature of around 240-260° C. In the second route, the terephthalic acid is substituted by ester terephthalate of dimethylene, with the use of catalysts and a working temperature ranging between 170-210° C. During the reactions of polymerization by condensation of the routes mentioned, water and methanol are released. In the present invention, the PET resin is added in the preparation of the composite in the form of PET monomers for the purpose of crosslinking the material to confer mechanical resistance.

In the state of the art, there are few reports on using of PET in concrete with the load function; the bottle is crushed and the filaments serve to fill a composition or else the sleepers are made directly from plastic.

The state of the art describes composites that comprise PET in the form of filaments. In this case, the filaments have load function and not a matrix function, as noted in the object of the present invention. Additionally, both PET in the form of filaments, and the sleepers made directly with this polymer, are a thermoplastic version of polymer, that is, sensitive to temperature variation, resulting in warping and deformations. Moreover, the PET resin, used in the present invention, is a cross-linked thermorigid resin, which will not be influenced by temperature, maintaining the shape of the final article for long periods. Therefore, this is a completely different use of PET in composites for various purposes.

In the present invention, PET monomers are added in an amount ranging from 5% to 30%, in mass, preferably 8% to 25%, in mass and more preferably 10% to 20%, in mass, based on the total mass of the composition of the composite.

Further, the composite of the present invention comprises sand. In a preferred embodiment the composition of the sand is predominantly formed of silica particles, but may contain other minerals such as: feldspar, mica, zircon, magnetite, ilmenite, monazite and cassiterite. Commercial sand also has moisture, considering that it is a medium granulometry sand (0.2 mm to 0.6 mm) washed for the removal of most organic impurities.

In the present invention, sand is added in an amount ranging from 40% to 95%, in mass, preferably 45% to 90%, in mass and more preferably 50% to 80%, in mass, based on the total mass of the composition of the composite.

Further, the composite of the present invention comprises at least a load being selected from among the group consisting of fly ash, silt, calcium carbonate powder, stone dust, foundry sand, fine sand, silica and combinations thereof, which act as load filling in potential empty spaces between the grains of sand. The material that constitutes the fly ash solidifies in suspension in the exhaust gases of the burners, being collected by electrostatic precipitators or removed by mechanical filtration. Solidification in suspension in a gas-flow leads to particles, preferably spherical, in many cases hollow or with a large volume of pores, with dimensions ranging from 0.5 μm to 100 μm.

Given their origin in mineral impurities contained in coal, the ashes are mostly made up of silicon dioxide ($SiO_2$), aluminum oxide ($Al_2O_3$) and iron oxide ($Fe_2O_3$). The ashes display pozzolanic activity, reacting to normal temperature and in the presence of water with the calcium hydroxide and alkali form calcium silicate hydrates, compounds with the ability to handle Portland cement, this is, these compounds maintain cohesion between the aggregates and the cement matrix. In the present invention, the pozzolanic activity is not relevant, considering that the matrix is not Portland cement, but polymeric resin, whose curing reactions do not involve the formation of hydrated calcium silicate.

Depending on its composition and pozzolanic activity, the fly ash is classified by ASTM C618 in two categories: (1) Fly ash of class F; and (2) fly ash of class C. The main difference between these two classes is the calcium, silica, alumina and iron content in its composition, which in turn determines the physical and chemical properties of the material and consequently its properties as material for technological uses.

In the present invention, ash is added in an amount ranging from 2% to 30%, in mass, preferably 4% to 25%, in mass and more preferably 5% to 20%, in mass, based on the total mass of the composition of the composite.

Optional Components

The composite that is the object of the present invention may also contain:

A reaction-promoting system that blends to resin in an amount ranging from 0.1% to 7.0%, in mass, based on the total mass of the composite. Preferably, 0.5 to 3.0% of cobalt naphthenate or cobalt octoatate is used, either alone or associated with dimethylaniline (DMA) in an amount ranging from 0.001% to 0.100%;

An initiator in an amount ranging from 0.1% to 5.0%, in mass, based on the total mass of the composite. Preferably, 0.1% to 1.0% of methyl peroxide ethyl ketone compound is used, medium reactivity, desensitized with dimethylphthalate;

A compatibilizing additive, also called coupling agent, used in an amount ranging from 0 to 1.0% in mass of the compound, preferably being vinyltrimethoxysilane, but may be substituted for methacryltrimethoxysilane, methacryloxypropyltrimethoxysilane, calcium diacrylate, zinc diacrylate and combinations thereof;

A flexibilizing additive of the polymer structure, used in an amount ranging from 0 to 1.0% in mass of the compound, being selected from among butylacrylate, butylmethylacrylate, methylmethacrylate, triethyleneglycolmethacrylate, ethylhexylmethacrylate and combinations thereof;

Ground rubber, originating from tires in an amount ranging from 0% to 40%, in mass, based on the total mass of the composite. Preferably, 0% to 25% of ground rubber is used;

Fiberglass or metal fiber, and may be short and distributed evenly in the matrix, or long and aligned in a single direction, in an amount ranging from 0% to 10%, in mass, based on the total mass of the composite. Preferably, 0% to 2.5% of fiberglass or metal fiber is used;

Metal or polymeric, wire structures or screens in an amount ranging from 0% to 25%, in mass, based on the total mass of the composite. Preferably, 0% to 15% of metal or polymer structures is used;

Finishes such as dyeing or polishing may be an option depending on the application of the article produced.

In a preferred embodiment, the polymer composite of the present invention is used in preparing various articles such as railroad sleepers, crossheads, beams, interlocking floors, pre-molded civil engineering panels, artificial stone for countertops and flooring, paving slabs used in bridges, paneling and cobogos.

In this case, the sleeper, being a preferred embodiment among the articles of the present invention presents various characteristics, including:

Total attendance to loads requested that preferably range from 20 tons/axle up to 40 tons/axle;

Longer useful life than a concrete sleeper;

Price of the part is lower than the steel part.

Process of Preparing the Polymer Composite of the Present Invention

The polymer composite of the present invention preferably is prepared based on a process comprising the following steps:

A. Drying the sand;

B. Weighing each component being at least a resin, sand and loads;

C. Mixing drying components being sand and at least a load for about 20 minutes, until it becomes altogether homogenous, using conventional mechanical mixer (cement mixer type, or industrial mixer) or else manual mixing depending on the amount of composite using mixer composite to be produced, at ambient pressure and temperature;

D. Adding at least an additive, being at least a coupling agent or a flexibilizing agent or combinations thereof in at least a resin for forming the organic mixture, also called syrup. Mix for a few seconds.

E. Adding the initiator to the organic mixture or syrup and mixing for a few seconds, until a homogenous appearance is obtained.

F. Adding the organic mixture or syrup to the mixer containing the mixture of the dry aggregates and subsequent mixing for 1 to 2 minutes, until it has a homogenous appearance.

G. Molding in mold of the article to be produced, preferably previously slathered with demoldant, which can be paraffin, mineral oil, polymeric solution of linear polymers (polyethylene, polypropylene, polyalcoholvinylic, polyvinyl chloride, polytetrafluorethylene) and/or combinations thereof.

H. Pre-curing in ambient pressure stove at a temperature of about 60° C. for 120 minutes on average and subsequent curing for at least 7 days at ambient pressure and temperature.

Process of Preparing the Sleeper of the Present Invention

The sleeper of the present invention preferably is prepared based on a process comprising the following steps:

A. Preparing the composite according to the process described above;

B. Molding in the sleeper mold in the suitable gauge to be produced.

C. Pre-curing in ambient pressure stove at a temperature of 60° C. for 120 minutes and subsequent curing for at least 7 days at ambient pressure and temperature.

It is emphasized that this new composite may substitute, total or partially, depending on the operating conditions of the track, the sleepers made of hardwood, eucalyptus and concrete because:

Hardwood is currently controlled and has low availability for manufacturing sleepers made of wood;

Eucalyptus wood does not present durability compared to other sleepers;

The concrete presents rapid deterioration in the reinforced structure, due to corrosion;

The present invention presents countless technical and economic advantages when compared to the state of the art, some being listed below:

The polymer composite of the present invention presents an infinite potential of applications (metric gauge sleepers, wide gauge, crossheads, etc.) due to its high mechanical resistance, excellent dielectric properties, low porosity and absorption of water; resistance to chemicals and corrosion, as well as low weight;

This product has advantages over sleepers made of wood, since the product does not sustain fungal attack and consequent proliferation of insects besides not deteriorating over time this product.

Is resistant to rotting, insect attack and solar radiation;

Possible absorption of water does not result in loss of hardness or other mechanical property, as it occurs through potential porosity, without chemical reaction with water;

In relation to reinforced concrete, it is lighter, waterproof because it does not require an iron frame, similar to reinforced concrete, in its structure;

The composite of the present invention does not comprise toxic components, after curing.

Further, in relation to the sleeper of the present invention:

Behaves with satisfactory performance when subjected to loads of rolling stock or traction with up to 32.5 t/axle in the wide gauge or smaller loads in the metric and standard gauges;

Compatible performance with the performance presented by sleepers made of wood from pure core to the same spacing as that adopted for wood;

Do not report signs of crushing or deformation in the fastening region, when subjected to traffic conditions cited in this document;

The cross section of the sleepers is intact, free of voids or bubbles;

Has insulating properties, offering no risk of occupation of the track circuit.

Admits any dimension;

The production of the part is inert and waterproof;

Is highly homogeneous generating reliability;

Preferably, is produced with fly ash as load which is a liability for steel, thermoelectric and farming industries;

Does not use water in its production, and so does not generate liquid effluents.

Example of Composition of the Composite of the Present Invention

Below is a preferred embodiment of the composite object of the present invention:

| Raw materials | Amount (%) |
| --- | --- |
| Resin | 10.0-18.0 |
| Initiator | 1.0 |
| Fly ash | 12.0 |
| Sand | 75.0-85.0 |
| Flexibilizing or coupling additive | 0.5-1.0 |
| Glass powder | 5.0-6.5 |

Wherein the pre-accelerated resin may already contain a reaction promoter being preferably 1% cobalt naphthenate;

1% initiator allows a working time of approximately 15 minutes. If this amount is reduced, for example, to 0.5%, the working time becomes about 29 minutes;

The content of loads (selected from the group consisting of fly ash, silt, calcium carbonate powder, stone dust, foundry sand, fine sand, silica and combinations thereof) refers to the total amount of aggregate;

Molding for 10 min—pressure 1.8 MPa.

Specification of the aggregates—not exceeding 1% moisture

Specific mass of the sand—2.65 g/cm$^3$

Specific mass of the fly ash—2.16 g/cm$^3$

Tests

Thermal Properties

A preferred embodiment, obtained with the dicyclopentadiene (DCPD) resin, was tested in its thermal properties to determine its thermal stability and degradation, by the techniques of differential scanning calorimetry (DSC) and thermogravimetric analysis (TGA) in the CCDM certified laboratory (Center for Characteristics and Development of Materials/DEMA/UFSCar).

The differential scanning calorimetry test measures the energy difference supplied to a substance and the reference material, depending on the temperature while both are subjected to a controlled temperature variation program. As the phase transitions of the materials occur under heat flow, or releasing (in exothermic events) or absorbing (in endothermic events), phenomena such as: fusion, solidification, vitreous transition, curing and oxidation. The DSC curves of a preferred embodiment were obtained using a Netzsch model DSC 214 Polyma equipment, under nitrogen flow of 50 mL/min, in a sealed aluminum pan, according to the following heating/cooling program:

a. Heating at a temperature from 23° C. to 300° C. at a rate of 20° C./min.

b. Isotherming at a temperature of 300° C. for a period of 5 minutes.

c. Cooling the temperature 300° C. to a temperature of 23° C. at a rate of 20° C./min.

d. Isotherming at a temperature of 23° C. for a period of 5 minutes.

e. Heating at a temperature from 23° C. to a temperature of 300° C. at a rate of 20° C./min.

The results of the sample of the preferred embodiment, obtained with the dicyclopentadiene (DCPD) resin, of this invention showed that after 14 days of curing, there is a small residual curing with two events of the order of consumption of 10 and 20 J/g a temperature of 114° C. and 230° C., the curing being practically closed in this period. In conventional Portland cement concrete, most of the curing occurs in the first 7 days, considering the process practically complete after 28 days.

Thermogravimetric analysis is defined as an analytical technique in which the sample mass variation is measured as a function of temperature variation. The thermogravimetric analysis of this same preferred embodiment was performed in a thermogravimetric analyzer of the TA Instruments model TA Q500, with a heating rate of 20° C./min in an alumina pan, in a temperature range of 30 to 850° C. In the temperature range of 30° C. to 550° C., an inert nitrogen atmosphere with a flow of 50 mL/min was used. In the temperature range of 550° C. to 850° C. the atmosphere was changed to an oxidative oxygen atmosphere with a flow rate of 50 mL/min.

The results of this preferred embodiment, obtained with the dicyclopentadiene (DCPD) resin, revealed a small elimination of 0.79% m/m of residual monomers and water from residual curing (up to temperature of 230° C.). Mass loss of 8.11% m/m related to degraded organic material (polymers of lower molar mass) up to temperature of 550° C. was also observed, with residual ash (up to temperature of 850° C.) being 90.44% m/m. This result demonstrates a great thermal stability of the material obtained in a preferred embodiment.

Morphology and Estimation of Elementary Chemical Composition

The analysis of the morphology and estimation of the elementary chemical composition of the product of the same preferred embodiment was performed using a scanning electron microscope (SEM) model Inspect S50 FEI with EDS, with the sample of the preferred embodiment having received gold coating, in an amount of about 10 to 20 nm, and using secondary electrons emitted for the analysis of morphology and X-rays emitted for analysis of the estimation of elementary chemical composition by the EDS.

The results show a material with the aggregate phases evenly distributed, with low porosity and excellent adhering among the aggregates and the polymeric matrix. Unlike the traditional Portland concrete, which presents many internal phases, derived from the curing reactions of the same and the insertion, during its preparation, and high porosity, open and closed, formed by the release of gases during the curing process. The EDS analysis showed that this preferred embodiment presents an elementary chemical composition of 45.36% carbon, 25.73% oxygen, 21.79% silicon, 5.35% aluminum, 1.77% potassium.

Flammability Test

The flammability test of the same preferred embodiment was conducted by the CCDM certified laboratory, following IEC 60695-11-20:2015 Fire Hazard Testing—Part 11-20: Test Flames. The results showed that the object of the present invention is flame-resistant, presenting no visible flame on the opposite side of the body and no hole formation greater than 3 mm after cooling.

Mechanical Properties

The determination of axial and traction compression by diametric compression was carried out in a certified laboratory of Falcao Bauer (Technological Center for Quality Control) according to ABNT NBR 7680-1/2015 (AST MM C39) and ABNT NBR 7222:2011 (ASTM C496/C496M) standards, on samples of a preferred embodiment obtained with the dicyclopentadiene (DCPD) resin. The results showed an axial compression resistance value of (70.5±0.2) MPa and diametric compression traction (6.1±0.1) MPa. In a traditional Portland cement embodiment, it presents values of about 10 to 45 MPa of axial compression resistance and about 2 to 7 MPa of diametrical compression traction resistance, depending on the water/cement ratio used. It is therefore the preferred embodiment of the present invention, more resistant to axial compression than the traditional embodiment of Portland cement. The present invention further possesses diametric compression traction resistance similar to that achieved by the traditional embodiment of Portland cement.

Abrasion wear determination was tested in a Falcao Bauer (Quality Control Technology Center) certified laboratory according to ABNT NBR 9781-1/2013 (ASTM C936/C936M-20) standards in samples of preferred embodiment obtained with the dicyclopentadiene (DCPD) resin. The results showed an abrasion wear value of 19.5 mm, which according to ABNT NBR 9781 (ASTM C936/C936M-20) classifies the material as high strength, as it is below 20.0 mm of abrasion wear.

The compression on the rail support is obtained by applying a load of 445 kN on the rail supported on a plate of 360 mm×200 mm×42 mm at a constant rate of 120 kN/min. According to the AREMA:2019 standard the maximum elastic vertical displacement allowed is 6.3 mm and the maximum residual vertical displacement, after 1 minute load release, is 3.18 mm. The sleeper obtained with a preferred embodiment using a dicyclopentadiene (DCPD) resin of the present invention, presented elastic vertical displacement of 1.13 mm and residual vertical displacement of 0.38 mm.

The inserts were pulled out by applying the axial load of 37.8 kN in each insert, separately, the load being maintained for a period of 3 minutes, the inserts not being pulled out or damaged, and no damage, cracks or chips being noted at any point on the sleeper, obtained with a preferred embodiment obtained with the dicyclopentadiene (DCPD) resin of the present invention.

The tests of positive and negative moments in the supports and in the center were carried out according to the ABNT NBR 11709:2015 and AREMA:2019 standards using loads of 143.21 kN for the positive moment in the supports, 108.93 kN for the negative moment in the supports, 27.76 kN for the positive moment in the center and 39.66 kN for the negative moment in the center, no damage, cracks or chips being observed at any point on the sleeper, obtained with a preferred embodiment obtained with the dicyclopentadiene (DCPD) resin of the present invention.

The load test repeated on the support, also called the fatigue test, was performed according to the ABNT NBR 11709:2015 and AREMA:2019 standards, using loads of variants in the range of 14.32 kN to 157.53 kN, at a frequency of 7 Hz totaling 3 million load and discharge cycles, no damage, cracks or chips being observed at any point on the sleeper, obtained with a preferred embodiment obtained with the dicyclopentadiene (DCPD) resin of the present invention.

An overload of 250.62 kN was applied to the sleeper support at a rate of 50 kN/min and left for a period of 5 minutes being discharged in sequence, according to NBR 11709:2015 and AREMA:2019 standards, with no damage, cracks or chips being observed at any point on the sleeper, obtained with a preferred embodiment obtained with the dicyclopentadiene (DCPD) resin of the present invention. Next, the sleeper support was loaded again at the same rate until breakage, which occurred with a load of 318.30 kN.

Another preferred embodiment, obtained with the PET monomer resin, was tested for its mechanical properties of compression resistance and abrasion wear, in addition to the water absorption capacity in a Falcao Bauer certified laboratory (Technological Center for Quality Control) according to ABNT NBR 9781-1/2013 (ASTM C936/C936M-20) standards. The results showed an axial compression resistance value of $(64.9 \pm 8.2)$ MPa, with abrasion wear of 20.5 mm and water absorption of $(5.4 \pm 0.3)\%$.

Having described some examples of preferred embodiments of the present invention, it should be understood that the scope of the present invention covers other possible variations of the inventive concept described, being limited only by the content of the accompanying claims, potential equivalents being included therein.

The invention claimed is:

1. A polymer composite comprising:
sand of medium granulometry;
at least a load being selected from the group consisting of fly ash, silt, calcium carbonate powder, stone dust, foundry sand, fine sand, silica and combinations thereof;
at least a thermosetting resin comprising a combination of dicyclopentadiene and PET monomers of terephthalic acid and ethylene glycol; and
at least an additive that is either being selected from among:
a phase-compatibilizing additive including vinyltrimethoxysilane methacryltrimethoxysilane, methacryloxypropyltrimethoxysilane, calcium diacrylate, zinc diacrylate or combinations thereof; or
a flexibilizing agent being selected from among butylacrylate, butylmethylacrylate, methylmethacrylate, triethyleneglycolmethacrylate, ethyl hexylmethacrylate and combinations thereof.

2. The composite according to claim 1, wherein the dicyclopentadiene is present in an amount ranging from 5% to 30%, in mass, based on the total mass of the composite.

3. The composite according to claim 1, wherein the PET monomers are present in an amount ranging from 5% to 30%, in mass, based on the total mass of the composite.

4. The composite according to claim 1, comprising from 40% to 95% of sand of medium granulometry, in mass, based on the total mass of the composite.

5. The composite according to claim 1, comprising from 2% to 30% of at least a load, in mass, based on the total mass of the composite.

6. The composite according to claim 1, further comprising ground rubber, originating from tires.

7. The composite according to claim 1, further comprising fiberglass or metal fiber, and can be short and distributed evenly in the matrix, or long and aligned in a single direction.

8. The composite according to claim 1, further comprising screens and metal or polymer frames in layers or structures.

9. The composite according to claim 1, wherein the sand of medium granulometry comprises silica particles.

10. The composite according to claim 1, wherein the fly ash comprises silicon dioxide, aluminum oxide, and iron oxide.

11. A process of preparing the polymer composite of claim 1, the process comprising the following steps:
 a. Drying the sand of medium granulometry;
 b. Weighing the components of the composite;
 c. Mixing dry components being sand and a load for a period of 20 minutes, until the mixed dry components become altogether homogenous;
 d. Adding at least a liquid additive to a resin and mixing for a period of 1 to 2 minutes, until it presents a homogenous appearance, for forming an organic mixture or syrup;
 e. Adding an initiator to the organic mixture or syrup and mixing for 1 to 2 minutes;
 f. Adding the organic mixture to the mixed dry components;
 g. Molding in a mold of an artifact to be produced;
 h. Pre-curing in an ambient pressure stove at a temperature of 60° C. for 120 minutes and subsequent curing for at least 7 days at ambient pressure and temperature.

12. An article comprising the polymer composite of claim 1.

13. The article according to claim 12, wherein the article is a sleeper.

14. An article comprising the polymer composite prepared by the process of claim 11.

15. The article according to claim 14, wherein the article is a sleeper.

16. The composite according to 9, wherein the sand further comprises one or more of feldspar, mica, zircon, magnetite, ilmenite, monazite, or cassiterite.

* * * * *